United States Patent [19]

Morris et al.

[11] Patent Number: 4,686,600

[45] Date of Patent: Aug. 11, 1987

[54] MODULAR GROUND FAULT CIRCUIT BREAKER

[75] Inventors: Robert A. Morris, Burlington; Paul T. Rajotte, Plainville, both of Conn.

[73] Assignee: General Electric Company, New York, N.Y.

[21] Appl. No.: 725,730

[22] Filed: Apr. 22, 1985

[51] Int. Cl.[4] ........ H02H 3/16

[52] U.S. Cl. ........ 361/42; 361/99; 361/115; 335/18

[58] Field of Search ........ 361/42, 45, 49, 114, 361/115; 335/18

[56] References Cited

U.S. PATENT DOCUMENTS

| | | | |
|---|---|---|---|
| 3,812,400 | 5/1974 | Gryctko et al. | 335/18 X |
| 3,970,975 | 7/1976 | Gryctko | 335/18 |
| 3,999,103 | 12/1976 | Misencik et al. | 335/18 X |
| 4,282,500 | 8/1981 | Ducroquet et al. | 361/45 X |
| 4,513,268 | 4/1985 | Seymour et al. | 335/35 |
| 4,568,899 | 2/1986 | May et al. | 335/18 |

*Primary Examiner*—A. D. Pellinen
*Assistant Examiner*—Derek S. Jennings
*Attorney, Agent, or Firm*—Richard A. Menelly; Walter C. Bernkopf; Fred Jacob

[57] ABSTRACT

A modular ground fault circuit breaker is provided by the arrangement of a ground fault module and signal processor module operatively connected with a circuit breaker module. EAch of the modular components are individually tested and calibrated prior to assembly. The circuit breaker module consists of an automated residential circuit breaker modified to receive the ground fault and signal processor modules.

12 Claims, 7 Drawing Figures

MODULAR GROUND FAULT CIRCUIT BREAKER

BACKGROUND OF THE INVENTION

The advent of robotic assembly for residential circuit breaker components has realized substantial savings in both component and labor costs as well as resulting in a high quality performance molded case circuit breaker. One such circuit breaker is described within U.S. Pat. No. 4,513,268 entitled "Automated Q-Line Circuit Breaker" in the name of R.K. Seymour et al. This Application is incorporated herein for purposes of reference.

The concept of a modular ground fault circuit breaker proposes a separate signal processor module, ground fault module and a circuit breaker module. The signal processor circuit components are arranged on a unitary printed circuit board by a fully automated assembly process and are tested and calibrated prior to assembly within a ground fault module. The ground fault module is contained within a molded case which contains the mechanical and electrical interacting parts for interfacing the signal processor module with a circuit breaker module within a separate molded case and which contains the circuit breaker operating mechanism, the trip unit and the breaker contacts. The ground fault module is disclosed within U.S. Pat. Application Ser. No. 725,611 filed Apr. 22, 1985 entitled "Ground Fault Module For Ground Fault Circuit Breaker" and the signal processor module is disclosed within U.S. Pat. Application Ser. No. 725,610, filed Apr. 22, 1985, entitled "Signal Processor Module For Ground Fault Circuit Breaker" both in the names of R.A. Morris et al., both of which are filed concurrently with the instant Application.

The purpose of the instant invention is to describe a modified automated molded case residential circuit breaker which forms the circuit breaker module for assembly with the aformentioned signal processor and ground fault modules and which, when assembled thereto, forms a completely automated ground fault circuit breaker having ground fault, short circuit, and overcurrent circuit protection.

SUMMARY OF THE INVENTION

The invention comprises a circuit breaker module which contains means for interacting with a ground fault module and signal processor module for providing ground fault, short circuit and overcurrent circuit protection. The circuit breaker module further includes means for receiving the push-to-test button and the test spring as well as terminal means for electrical interconnection with the ground fault and signal processor modules. The combination of the circuit breaker module with the pre-assembled signal processor and ground fault modules results in an automated ground fault circuit breaker assembly.

DESCRIPTION OF THE PREFERRED EMBODIMENT

Figure 1:
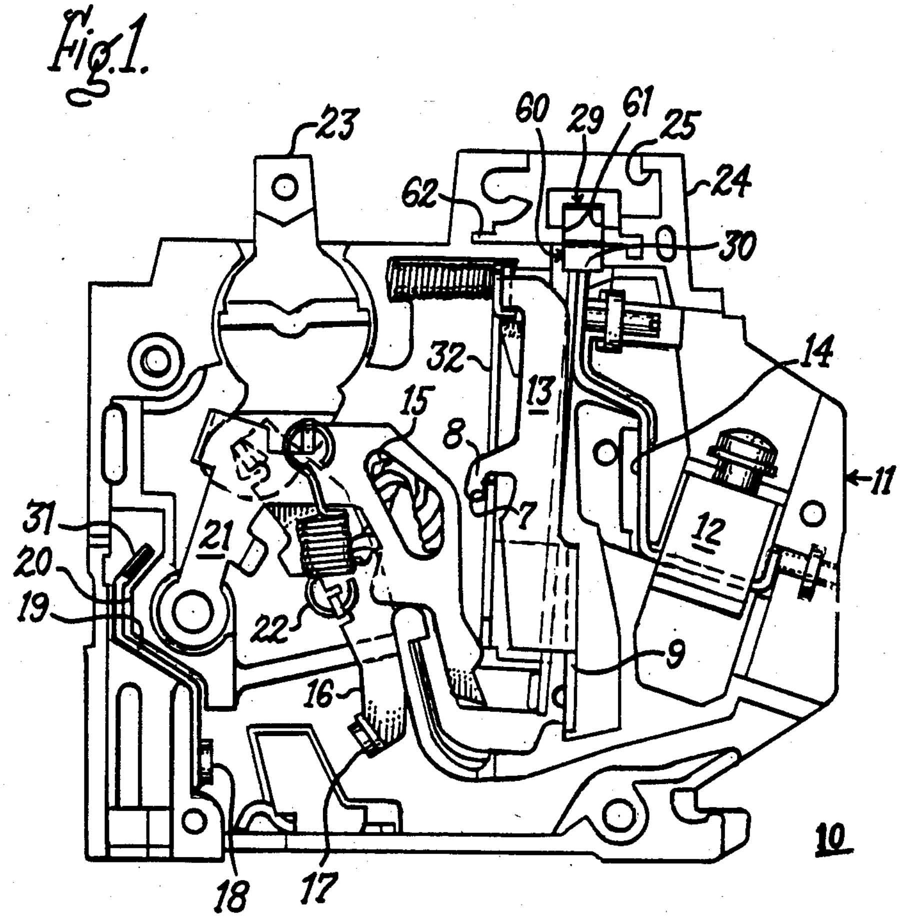
FIG. 1 is a plan view of the circuit breaker module according to the invention.

The circuit breaker module 10 shown in FIG. 1 consists of a molded case 11 which houses the load terminal connector 12 electrically connected with an electromagnetic trip device 13 by means of a bimetal trip device 9 and the load strap 14. A braid conductor 15 electrically connects the movable contact arm 16 with the bimetal. The circuit through the breaker is open and closed by means of the movable contact 17 at the bottom end of the movable contact arm 16 and the fixed contact 18 which is attached to the line strap 19 arranged within a recess 20 formed within the case. An operating cradle 21 and an operating spring 22 cooperate to separate the contacts upon the occurrence of a short circuit or overcurrent condition as sensed by the electromagnet 13 and the bimetal 9 respectively. The latch 32 is attracted to the electromagnet 13 causing the latch 32 to pull away from and release the cradle 21. The bimetal 9 operates by moving the electromagnet 13 which in turn pulls the latch 32 away from the cradle by engagement of the hook extension 8 on the electromagnet with the shelf 7 formed on the latch 32. An operating handle 23 is used for manually opening and closing the contacts in the manner described within the aforementioned U.S. Pat. No. 4,513,268. The module differs from the circuit breaker described within the referenced Application by the provision of an extension 24 molded with the case and containing a recess 25 formed therein for receiving the test button 26 shown in FIGS. 2 and 3. The circuit breaker module also differs from the aforementioned automated Q-line circuit breaker by the provision of a terminal end 31 extending perpendicular from the line strap 19 and best seen by referring to FIG. 2. A test spring 29 is mounted within the molded extension 24 and arranged such that a flat strip end 59 extends upward in the same plane as the terminal end 31 as seen by referring to FIGS. 2 and 2A. The end 60 of the test spring 29 contacts the top junction 30 of the bimetal 9 and load strap 14 and electrically connects the test spring to the load side of the breaker without requiring additional wiring as shown in FIGS. 1 and 3A. The test spring is retained within an integrally formed spring slot 61 which adjoins the test spring anchor slot 62 as indicated in FIG. 1.

Figure 2:
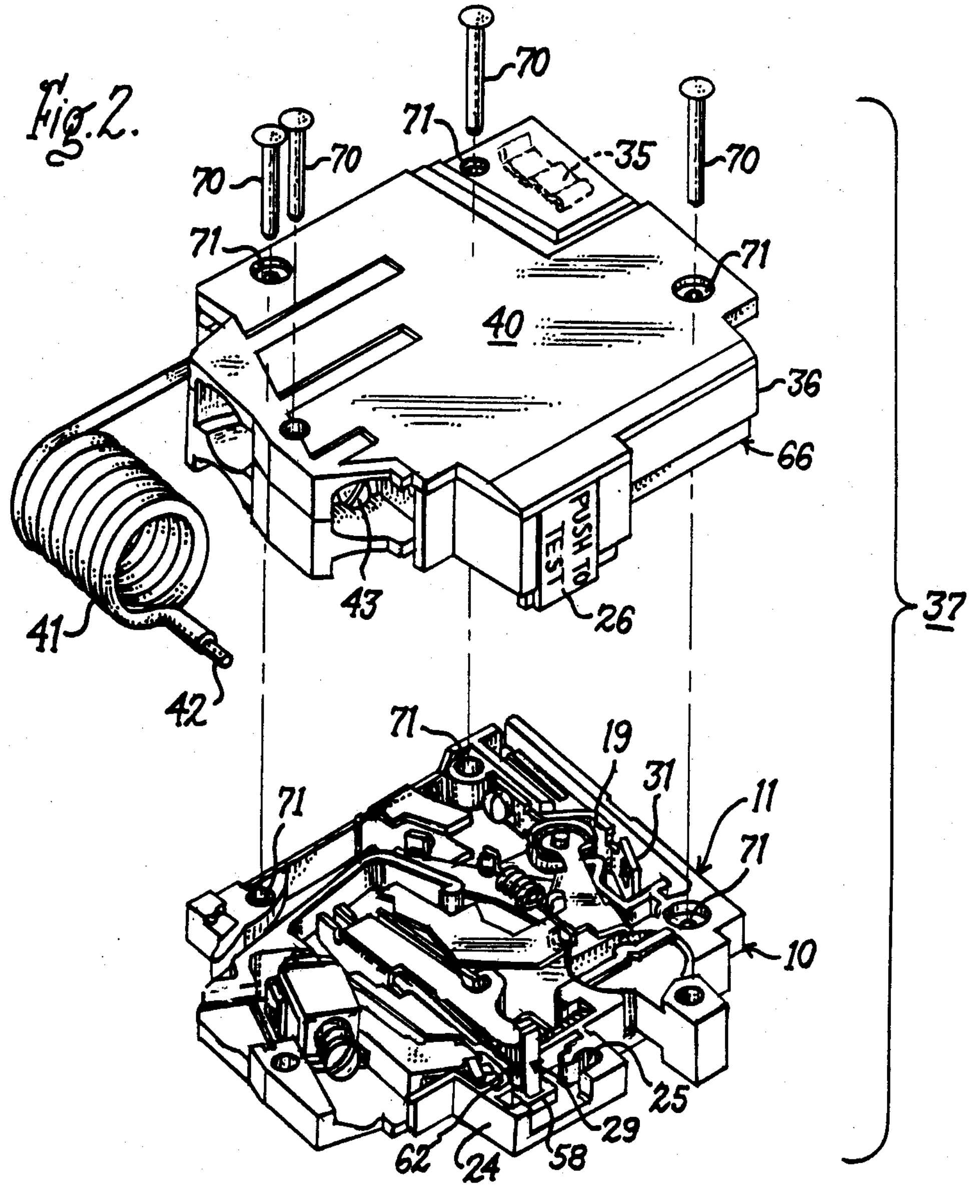
FIG. 2 is a top perspective view of the circuit breaker module prior to assembly with the ground fault module which is depicted in isometric projection.
Figure 2A:
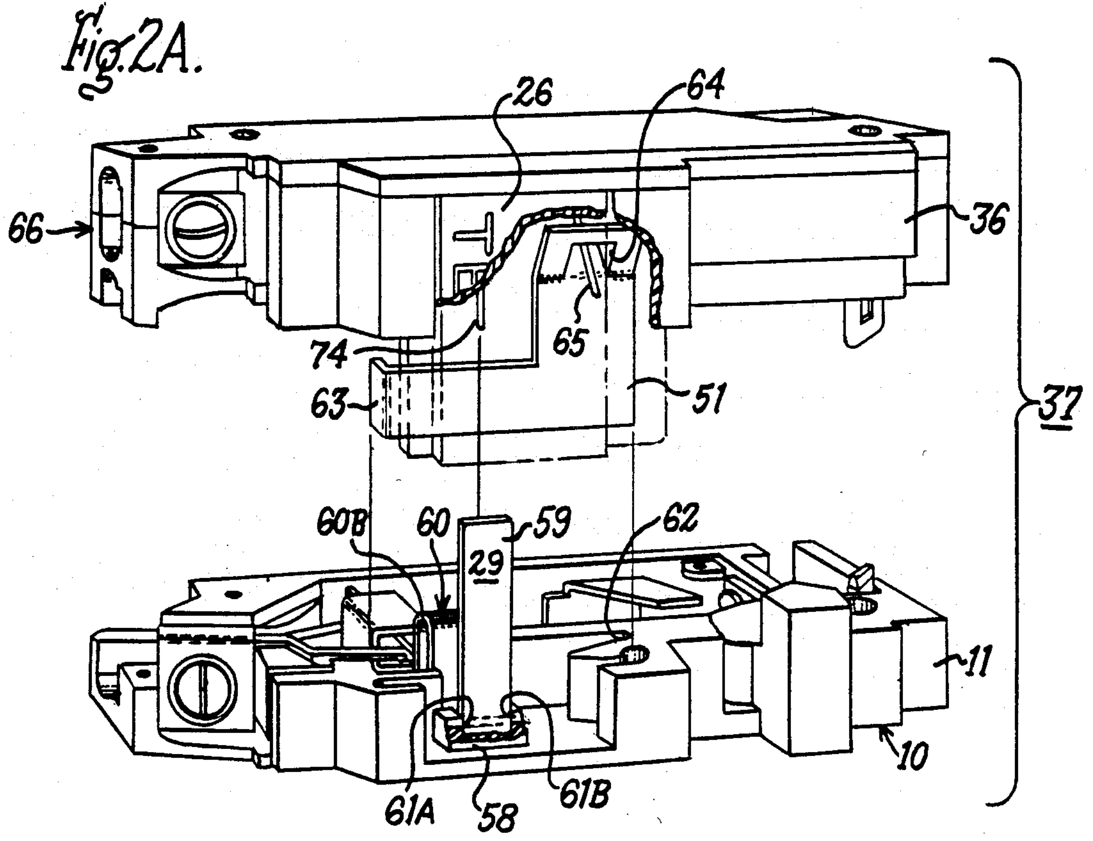
FIG. 2A is a front perspective view of the arrangement depicted in FIG. 2.
Figure 3A:
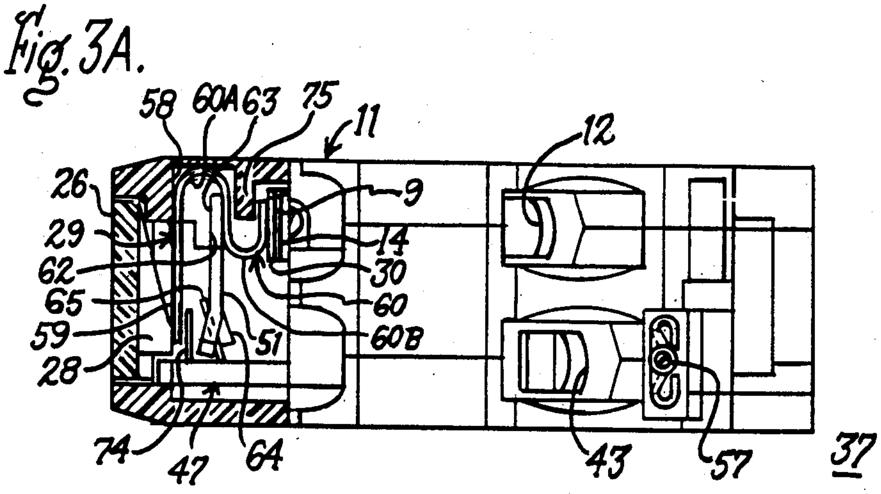
FIG. 3A is a partially sectioned side view of the breaker of FIG. 3 to show the test spring assembly.

The ground fault circuit breaker 37 is depicted in FIG. 2 and comprises the combination of the pre-assembled ground fault module 66, which houses the signal processor module described within the latter aforementioned Morris et al. Pat. Application Ser. No. 725,610, with the circuit breaker module 10. The ground fault module 66 enclosed within the case 36 and cover 40 is positioned over and "downloaded", that is assembled from a vertical position, onto the circuit breaker module 10 and attached by means of rivets 70 and holes 71 formed through the ground fault module 66 and the circuit breaker module case 11. The registration between the test button 26 and the molded extension 24 allows the test button to become captured within the test button recess 25 and allows the test spring anchor 51 shown in FIG. 2A with a bottom offset 63 extending below the ground fault module case 36 to become captured in the test spring anchor slot 62. The test spring 29 supported within the pedestal 58 integrally formed within the case 11, is secured within the case by means of the test spring anchor bottom offset 63, hereafter "bottom offset", when the ground fault module is assembled to the circuit breaker module and fastened thereto. The test spring anchor 51 depicted in FIG. 2A includes a lanced aperture 64 formed near the top thereof opposite the end wherein the bottom offset 63 is formed. The test spring 29 supported within the hollow pedestal 58 is retained by the bottom offset 63 in the following manner. The spring consists of an S-shaped end 60 having reversed top and bottom curvatures 60B, 60A opposite the flat strip end 59 as shown in FIG. 3A. The bottom offset 63 is pressed between the S-shaped end 60 and seats within the bottom curvature 60A as well as within the test spring anchor slot 62. The S-shaped end 60 is laterally supported by the sides of the test spring slot 61A, 61B as best seen in Fig. 2A. Referring back to FIG. 2, electrical connection with the ground fault module 66 is made by means of the line stab 35, the neutral terminal lug 43 and by the coil of insulated wire 41 electrically connected with the signal processor terminal 57, shown in FIG. 3, to which access is made by means of the exposed end 42.

Figure 3:
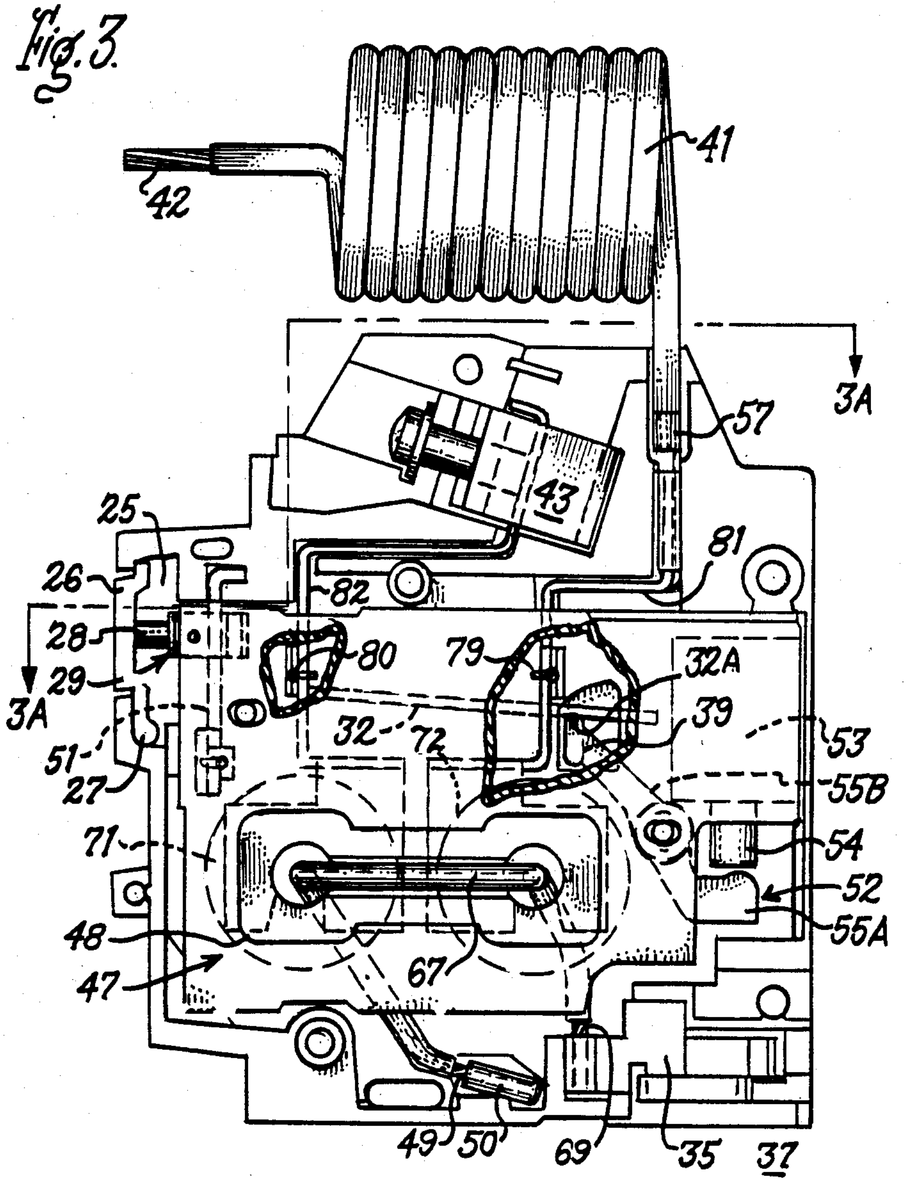
FIG. 3 is a partially sectioned plan view of the completely assembled modular ground fault circuit breaker of the invention.

The completely assembled ground fault circuit breaker 37 is depicted in FIG. 3 viewed from the top with respect to FIG. 2 and with the cover 40 removed to expose the signal processor module 47 and to show the conductive path provided between the differential current transformer 71 and neutral excitation transformer 72 contained therein by means of the connecting strap 48. The separate electrical path is provided by the insulated wire conductor 67 as described within the latter referenced Morris et al. Pat. Application Ser. No. 725,610. External electric connection with the insulated wire conductor 67 is made by means of the line conductor end 69 and the line stab 35. Connection between the insulated wire conductor 67 and the circuit breaker module 10 is made by means of the conductor end 49 and flag type spade connector 50 which engages the terminal end 31 of the circuit breaker module strap 19 depicted earlier in FIG. 1. External electrical connection with the circuit breaker module components is made by means of the load terminal connector 43 and the connector strap 80 which is connected with the connecting strap 48 as indicated in the cutaway portion of 47.

Figure 5:
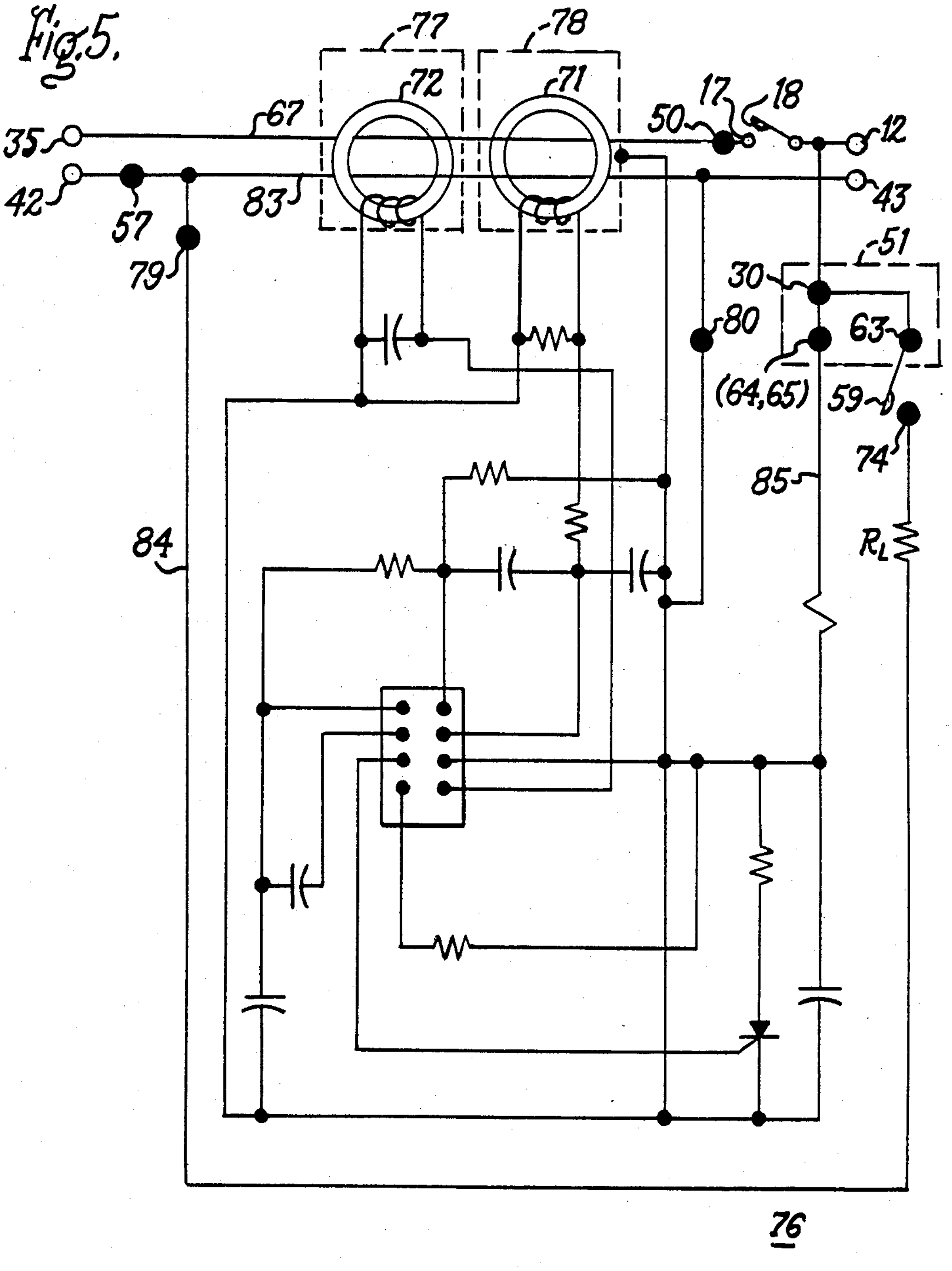
FIG. 5 is a diagrammatic representation of the signal processor circuit used within the ground fault module depicted in FIG. 2.

The engagement of the test spring anchor 51 with the test spring 29 and the arrangement of the test button 26 for a slight rotation about the pivot 27 integrally formed with the test button for movement within the recess 25 as well as the abutting engagement of the test button extension 28 with the test spring 29 is depicted in FIG. 3 and detailed in FIG. 3A. The test button extension 28 comprises a ramp-type configuration which contacts the test spring 29 when the test button is depressed and forces the flat strip 59 into contact witn the pin contact 74 extending from the signal processor module 47. Electrical connection along with return bias for the test button is multifunctionally provided by means of the test spring. When the test button is released the flat strip forces the test button back to its initial rest position and breaks electrical contact with the pin contact. Electrical connection between the signal processor module 47 and the test spring anchor 51 is made by capturing the pin contact 65 extending from the signal processor module 47 within the lanced aperture 64. The bottom of the test spring 29 is retained within the hollow pedestal 58 integrally formed with the circuit breaker module case 11 by the placement of the bottom offset 63 of the test spring anchor 51 within the test spring bottom curvature 60A as described earlier and arranging the test spring top curvature 60B over a projection 75 formed in the case 11 as best seen in FIG. 3A. The S-shaped end 60 of the test spring captured within the test spring slot 61 by the edges 61A, 61B of the test spring slot 61 as best seen in Fig. 2A. The top junction 30 of the bi-metal 9 with the load strap 14 also provides mechanical support to the test spring while maintaining electrical connection with the test spring anchor 51 and the test spring. Depressing the test button 26 in the direction indicated in FIG. 3A causes a temporary electrical connection between the line and neutral circuits within the ground fault module as seen by referring now to FIG. 5. The signal processor circuit 76 is identical to that described within the aforementioned Howell Patent and is depicted herein to identify the points of electrical connection between the signal processor module, the ground fault module and the circuit breaker module. Common reference numerals will be used to identify the module components within the signal processor circuit where possible. The electrical interconnection points are depicted as enlarged electric contact points to distinguish over the printed circuit connections and are numerically identified with respect to the previous illustrations. The differential current transformer 71 is enclosed within a metal can 78 which is electrically connected with the signal processor circuit as indicated. The metal can 77 which encompasses the neutral excitation transformer 72 is electrically isolated from the circuit. The first electrical path through the transformer is provided by the insulated wire 67 which interconnects the line stab 35 and the flag type spade connector 50 which directly connects with the fixed contact 17. The moving contact 18 is directly connected with the line load terminal lug 12. The other electrical path through the transformers generally indicated as 83 in FIG. 5 is provided by the line neutral strap 81, connecting strap 48 and the load neutral strap 82 which interconnects with the signal processor module by means of the signal processor terminal 57 and with the external circuit by means of the exposed end 42 of the insulated external wire 41 as shown in FIG. 3. Electrical connection with the second electrical path is made by means of the neutral terminal lug 43. The test circuit path 84 connects with the second electrical path at the line side which includes the line neutral connector pin 79 and temporarily connects through a current limiting resistor RL with the first electrical path through the test pin contact 74 and the spring flat strip 59 as described earlier. The test spring anchor 51 electrically connects with the first electric path by means of the pressfit connection between the bimetal and load strap junction 30 and the bottom offset 63 of the test spring anchor 51. Electrical connection with the line side of the signal processor power supply circuit path 85 is provided by means of the signal processor module contact pin 65 and the lanced aperture 64 on the test spring anchor 51. Connection with the neutral side of the signal processor power supply circuit path is provided by means of the load neutral connector pin 80.

Figure 4:
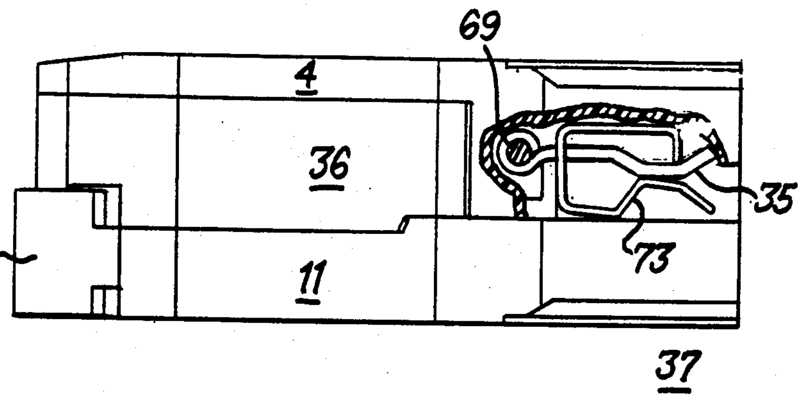
FIG. 4 is a partially sectioned view of the opposite side of the breaker of FIG. 3A to show the line stab.

The modular ground fault circuit breaker of the invention operates to detect short circuit and overcurrent conditions by means of the bimetal 9 and the electromagnet 13 and interrupts the circuit by operation of the latch 32, cradle 21 and operating spring 22 upon the contacts 17, 18 depicted in FIG. 1. Upon occurrence of a ground fault condition sensed within the signal processor module 47 of FIG. 3 the trip solenoid 53 is energized causing the plunger 54 to impact one arm 55A of the trip lever 52 and rotate the other arm 55B and the perpendicular extension 39 in the clockwise indicated direction about the pivot 56. As described within the latter referenced Morris et al. Patent Application, the extension 39 contacts the bottom 32A of the latch 32, shown in FIG. 3, and articulates the operating mechanism by pulling the latch 32 away from the cradle 21 which separates the contacts 17, 18 under the urgence provided by the charged operating spring 22. One embodiment of the modular ground fault circuit breaker 37 is depicted in FIG. 3A with the coil of wire 41 removed. The line load terminal lug 12 is situated adjacent the neutral load terminal lug 43. The signal processor terminal 57 is also accessible from the same end of the modular ground fault circuit breaker. The opposite end of the modular ground fault circuit breaker 37 is shown in Fig. 4 to illustrate the operating handle 10 and electrical access to the line stab 35 which includes a spring clip 73 connected with the line conductor 69 for engagement with the external circuit line plug (not shown).

It is thus seen that a complete ground fault circuit breaker can be fabricated from pretested and calibrated signal processor, ground fault and circuit breaker modules at a substantial savings in assembly time. The order of assembling the three component modules can be reversed to that indicated in FIG. 2 for some molded case modular ground fault circuit breaker designs.

Having described our invention, what we claim as new and desire to secure by Letters Patent is:

1. A ground fault circuit breaker module comprising:
a molded plastic case;
- a pair of separable contacts within said case connected in series with thermal and magnetic trip means between a load and line terminal for automatic separation by means of an operating mechanism upon predetermined overcurrent through said contacts;
- a handle operator for opening and closing said separable contact independent of said operating mechanism;
- an extension on said plastic case having first slot means formed therein for receiving a portion of a ground fault circuit test button and second slot means formed within said extension for receiving a portion of a test spring anchor; and
- a test spring within said extension for operatively providing bias to said test button when depressed to a test position for returning said test button to an initial rest position, said test spring comprising a flat strip end and an S-shaped end.

2. The ground fault circuit breaker module of claim 1 further including a terminal end on said line terminal upwardly extending from said molded case for slidingly receiving line terminal connection means on a separate molded case for providing electrical interconnection between said molded case and asid separate molded case.

3. The ground fault circuit breaker module of claim 1 wherein said extension is integrally formed with said molded case and is co-extensive with said operating handle.

4. The ground fault circuit breaker module of claim 1 wherein said test spring anchor includes a lanced aperture top part and an angled extension bottom part.

5. The ground fault circuit breaker module of claim 4 wherein said test spring anchor angled extension bottom part engages one of a pair of reverse curvatures comprising said S-shaped end.

6. The ground fault circuit breaker module of claim 1 further including recess means formed within said molded case proximate said line terminal for receiving a terminal blade.

7. A modular ground fault circuit breaker comprising in combination:
- a signal processor module having circuit means arranged for determining the occurrence of a ground fault current and energizing a solenoid to displace a solenoid plunger upon said ground fault current occurrence;
- a ground fault module within a molded case encompassing said signal processor module and said solenoid, said ground fault module further including an operating lever pivotally mounted within said case for interacting between said solenoid plunger and a circuit breaker operating mechanism within a separate circuit breaker module case, whereby a pair of separable contacts within said circuit breaker module case become separated to interrupt said ground fault current; and
- a test button arranged on a part of both said ground fault module molded case and said separate circuit breaker module case, said test button being biased to a first position by a test spring arranged within said separate circuit breaker module case and being retained therein by a test spring anchor, said test spring anchor comprising an apertured top part and an angled extension bottom part, said circuit breaker module being electrically connected with said signal processor module by projection of test pin contact extending from a bottom of said ground fault module and captured within said test spring apertured top.

8. The modular ground fault circuit breaker of claim 7 wherein said test spring comprises a flat strip end an an S-shaped end, a part of said test spring anchor being arranged within one of a pair of reverse curvatures forming said test spring S-shaped end.

9. The modular ground fault circuit breaker of claim 7 wherein said ground fault module includes a spade connector at one end of an insulated wire extending through said signal processor said spade connector extending downward from said signal processor module for connection with a terminal end extending upward from said circuit breaker module.

10. The modular ground fault circuit breaker of claim 7 wherein a line stab is arranged within said ground fault module case for external electrical access to said signal processor module.

11. A method of assembling a modular ground circuit breaker comprising the steps of:
- arranging a signal processor module containing ground fault sensing circuit means and a solenoid operated plunger;
- arranging an operating lever within a slotted ground fault module case having line terminal means for external electrical connection and assembling said signal processor module within said case with said solenoid operated plunger proximate one end of said operating lever and with said slot proximate an opposite end of said operating lever;

arranging a circuit breaker operating mechanism proximate a pair of separable contacts and a trip mechanism within a circuit breaker module case containing a test spring and a line terminal connector extending upward from said circuit breaker module case;

assembling said ground fault module case to said circuit breaker module case and aligning said operating lever opposite end with said trip mechanism for articulating said trip mechanism upon automatic response of said signal processor ground fault sensing circuit to open said contacts and aligning said line terminal means with said line terminal connector for providing electrical connection between said ground fault module case and said circuit breaker module case; and arranging an apertured test spring anchor within said group fault module case with an offset extension projecting below said ground fault module case into said circuit breaker module case for securing said test spring within said circuit breaker module case and for capturing a test pin contact extending from a bottom of said signal processor module for providing electrical connection between said signal processor and said test spring.

12. The method of claim 11 including the steps of arranging a test button within a slotted extension coextensive with both said ground fault module case and said circuit breaker case; and contacting a back surface of said test button with said test spring for biasing said test button to an initial position.

* * * * *